United States Patent
Kojima et al.

(10) Patent No.: US 10,941,954 B2
(45) Date of Patent: Mar. 9, 2021

(54) AIR-CONDITIONING SYSTEM

(71) Applicant: DAIKIN INDUSTRIES, LTD., Osaka (JP)

(72) Inventors: Nobuyuki Kojima, Osaka (JP); Akira Komatsu, Osaka (JP); Ryouta Suhara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 31 days.

(21) Appl. No.: 16/073,491

(22) PCT Filed: Dec. 12, 2016

(86) PCT No.: PCT/JP2016/086901
§ 371 (c)(1),
(2) Date: Jul. 27, 2018

(87) PCT Pub. No.: WO2017/149895
PCT Pub. Date: Sep. 8, 2017

(65) Prior Publication Data
US 2019/0049137 A1 Feb. 14, 2019

(30) Foreign Application Priority Data
Mar. 2, 2016 (JP) .............................. JP2016-039637

(51) Int. Cl.
*F24F 11/54* (2018.01)
*F24F 13/32* (2006.01)
(Continued)

(52) U.S. Cl.
CPC ............ *F24F 11/54* (2018.01); *F24F 1/0014* (2013.01); *F24F 11/79* (2018.01); *F24F 11/89* (2018.01);
(Continued)

(58) Field of Classification Search
CPC ...... F24F 1/0047; F24F 13/1426; F24F 11/54; F24F 11/89; F24F 2140/40; F24F 13/20; F24F 11/79; F24F 1/0014; F24F 1/028
See application file for complete search history.

(56) References Cited

U.S. PATENT DOCUMENTS

| | | | | |
|---|---|---|---|---|
| 2010/0010680 A1* | 1/2010 | Nishino | ................... | F24F 9/00 700/282 |
| 2012/0174608 A1* | 7/2012 | Kumamoto | .............. | F24F 11/72 62/186 |

FOREIGN PATENT DOCUMENTS

| | | |
|---|---|---|
| CN | 104990148 A | 10/2015 |
| EP | 2 048 450 A1 | 4/2009 |

(Continued)

OTHER PUBLICATIONS

English Translation of JP2002277034A (Year: 2002).*
(Continued)

*Primary Examiner* — Nelson J Nieves
*Assistant Examiner* — Schyler S Sanks
(74) *Attorney, Agent, or Firm* — Birch, Stewart, Kolasch & Birch, LLP

(57) ABSTRACT

Occurrence of a phenomenon in which an air current that has just been blown from any indoor unit is drawn into an adjacent indoor unit is reduced. A controller makes each of a plurality of indoor units perform a partial supply operation. In the partial supply operation, the controller controls an airflow direction adjusting flap such that, regarding the indoor units adjacent to each other with a predetermined distance α interposed therebetween, air currents are blown from both outlet openings which face each other with the predetermined distance α interposed therebetween, and that the air currents collide with each other.

4 Claims, 13 Drawing Sheets

(51) Int. Cl.
  *F24F 11/89* (2018.01)
  *F24F 11/79* (2018.01)
  *F24F 1/0014* (2019.01)
  *F24F 13/14* (2006.01)
  *F24F 1/0047* (2019.01)
  *F24F 3/16* (2021.01)
  *F24F 13/20* (2006.01)

(52) U.S. Cl.
  CPC .......... *F24F 13/1426* (2013.01); *F24F 13/32* (2013.01); *F24F 1/0047* (2019.02); *F24F 3/1603* (2013.01); *F24F 13/14* (2013.01); *F24F 13/20* (2013.01)

(56) References Cited

FOREIGN PATENT DOCUMENTS

JP        7-27395 A      1/1995
JP    2002277034 A  *   9/2002

OTHER PUBLICATIONS

International Search Report (PCT/ISA/210) issued in PCT/JP2016/086901, dated Feb. 21, 2017.
Extended European Search Report dated Sep. 11, 2019 in corresponding European Application No. 16892730.9.

* cited by examiner

FIG.11
(a) FULL SUPPLY OPERATION
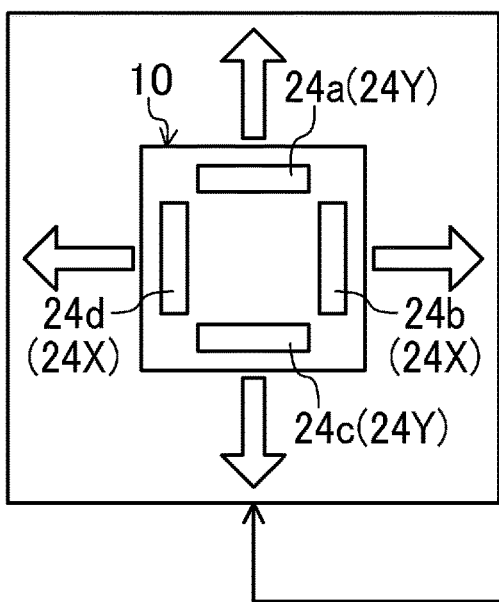
(b) FIRST PARTIAL SUPPLY OPERATION
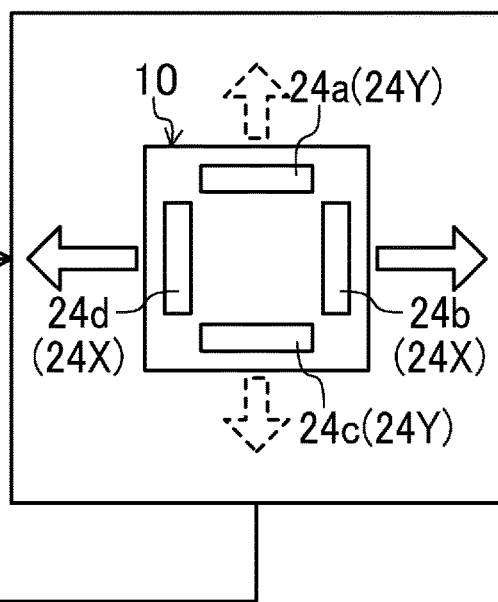
FIG.12
(a) FULL SUPPLY OPERATION
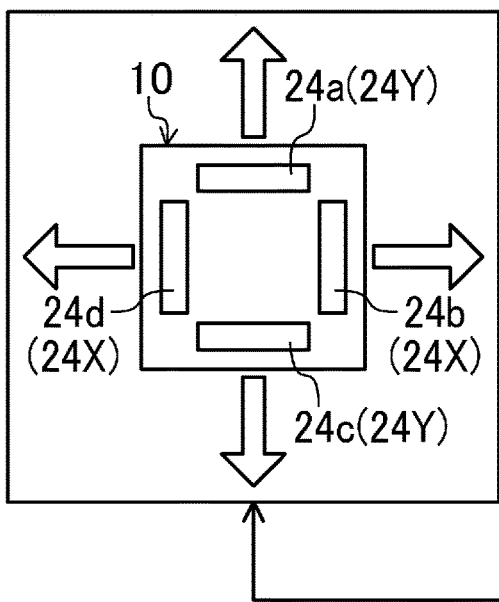
(b) SECOND PARTIAL SUPPLY OPERATION
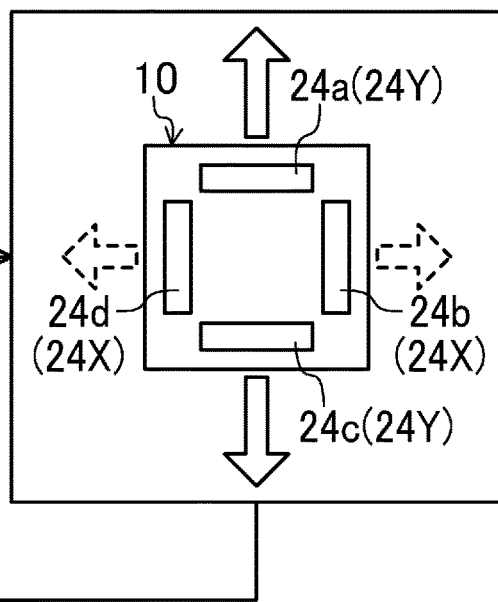

FIG.16
(a) FULL SUPPLY OPERATION
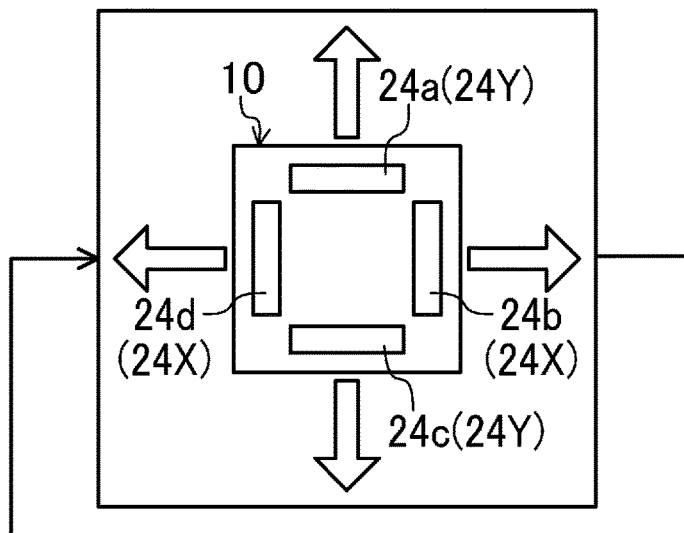
(c) SECOND PARTIAL SUPPLY OPERATION
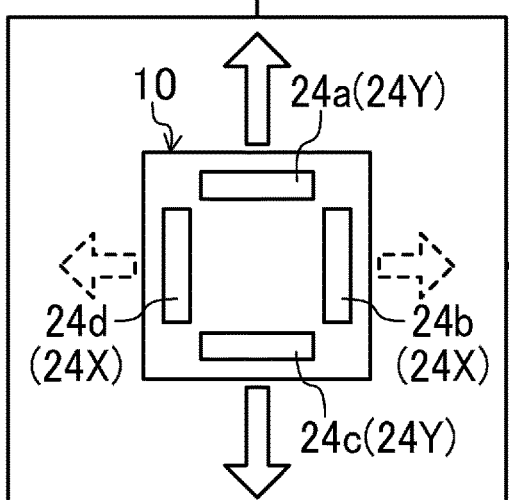
(b) FIRST PARTIAL SUPPLY OPERATION
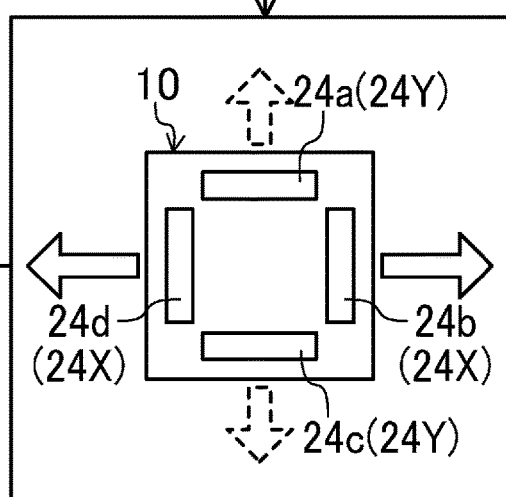

AIR-CONDITIONING SYSTEM

TECHNICAL FIELD

The present invention relates to an air-conditioning system.

BACKGROUND ART

Systems, such as the system disclosed in Patent Document 1, have been known. In Patent Document 1, a plurality of indoor units are embedded in the ceiling of the same room. A conditioned air current is supplied into the same room from each of the indoor units. In particular, in Patent Document 1, the direction and volume of the air current supplied from each indoor unit are controlled to optimize a temperature distribution in the room.

CITATION LIST

Patent Document

Patent Document 1: Japanese Unexamined Patent Publication No. H7-27395

SUMMARY OF THE INVENTION

Technical Problem

Some types of ceiling-mounted indoor units are configured to be able to blow air currents in a plurality of directions, e.g., in four directions. If such indoor units are installed in the ceiling of the same room so as to be arranged at a predetermined distance apart from one another in the horizontal direction, an air current that has just been blown from any indoor unit may be immediately drawn into an adjacent indoor unit in some cases.

The present invention is therefore intended to reduce occurrence of a phenomenon in which an air current that has just been blown from any indoor unit is immediately drawn into an adjacent indoor unit.

Solution to the Problem

The first aspect of the present disclosure includes: a plurality of indoor units (10) installed in a ceiling of an indoor space (500), the plurality of indoor units (10) each having an indoor casing (20) provided with a plurality of outlet openings (24a to 24d), an airflow direction adjusting flap (51) provided at a corresponding one of the outlet openings (24a to 24d) and configured to change a direction of air blown from the corresponding one of the outlet openings (24a to 24d), and an airflow blocking mechanism (50) provided at a corresponding one of the outlet openings (24a to 24d) for blocking an air current; and a controller (70) which controls the airflow blocking mechanism (50) in order to perform a partial supply operation in which, in each of the indoor units (10), the air current coming from one or some of the outlet openings (24a to 24d) is blocked by the airflow blocking mechanism (50), thereby increasing a speed of the air current coming from the rest of the outlet openings (24a to 24d), wherein in the partial supply operation, the controller (70) controls the airflow direction adjusting flap (51) such that, regarding the indoor units (10) adjacent to each other with a predetermined distance interposed therebetween, air currents are blown from the outlet openings (24a to 24d) which face each other with the predetermined distance interposed therebetween, and that the air currents collide with each other.

In this aspect, with respect to the indoor units (10) adjacent to each other, airflow direction adjusting flaps (51) of the outlet openings (24a to 24d) which face each other with the predetermined distance α interposed therebetween are at least controlled such that the air currents blown from the outlet openings (24a to 24d) collide with each other. The air currents which have collided with each other are forced to flow down toward the floor of the indoor space (500). It is thus possible to reduce the occurrence of the phenomenon in which an air current that has just been blown from the outlet opening (24a to 24d) is immediately drawn into an adjacent indoor unit (10).

A second aspect of the present disclosure is an embodiment of the first aspect. In the second aspect, the controller (70) controls the airflow blocking mechanism (50) and the airflow direction adjusting flap (51) in order to perform an airflow rotation in which a full supply operation supplying air to the indoor space (500) from all of the outlet openings (24a to 24d) and the partial supply operation are alternately performed.

In this aspect, in the partial supply operation of the airflow rotation, the air currents blown from the main outlet openings (24a to 24d) facing each other collide with each other. It is thus possible to reduce the occurrence of the phenomenon in which an air current that has just been blown from the outlet opening (24a to 24d) is immediately drawn into an adjacent indoor unit (10) in the partial supply operation. Further, the airflow rotation including the partial supply operation and the full supply operation allows the conditioned air to be supplied to an area in the indoor space (500) which is relatively close to the indoor unit (10) and an area in the indoor space (500) which is relatively far from the indoor unit (10). A difference in the temperature among areas in the indoor space (500) can thus be reduced.

A third aspect of the present disclosure is an embodiment of the first or second aspect. In the third aspect, the airflow direction adjusting flap (51) is capable of shifting to a position where the air current blown from the corresponding one of the outlet openings (24a to 24d) is blocked, and also serves as the airflow blocking mechanism.

In this aspect, the airflow direction adjusting flap (51) for changing the direction of the supply airflow in the vertical direction also serves as an airflow blocking mechanism (50) for blocking the flow of air. That is, the airflow direction adjusting flap (51) taking a predetermined position blocks the air coming from the outlet openings (24a to 24d).

A fourth aspect of the present disclosure is an embodiment of any one of the first to third aspects. In the fourth aspect, the indoor casing (20) of each of the indoor units (10) has a rectangular lower surface (22), and the main outlet openings (24a to 24d) are arranged such that one main outlet opening is provided along one of four sides of the lower surface (22).

Advantages of the Invention

According to an aspect of the present disclosure, it is possible to reduce the occurrence of the phenomenon in which an air current that has just been blown from the outlet opening (24a to 24d) is immediately drawn into an adjacent indoor unit (10).

Particularly according to the second aspect, the occurrence of the above phenomenon can be reduced in the partial supply operation. Further, the airflow rotation including the partial supply operation and the full supply operation allows the conditioned air to be supplied to an area in the indoor space (500) which is relatively close to the indoor unit (10) and an area in the indoor space (500) which is relatively far from the indoor unit (10). A difference in the temperature among areas in the indoor space (500) can thus be reduced.

Particularly according to the third aspect, the airflow direction adjusting flap (51) taking a predetermined position may block the air coming from the outlet opening (24a to 24d) in the partial supply operation.

BRIEF DESCRIPTION OF THE DRAWINGS

FIG. 11 is a diagram for explaining one cycle of a second supply mode, schematically showing a lower surface of the indoor unit in each operation.

FIG. 12 is a diagram for explaining one cycle of a third supply mode, schematically showing a lower surface of the indoor unit in each operation.

FIG. 16 is a diagram for explaining one cycle of a fourth supply mode according to a first variation, schematically showing a lower surface of the indoor unit in each operation.

DESCRIPTION OF EMBODIMENTS

An embodiment of the present invention will now be described in detail with reference to the drawings. The embodiment described below is merely an exemplary one in nature, and is not intended to limit the scope, applications, or use of the invention.

Embodiment

—General Description of Air-Conditioning System—

Figure 1:
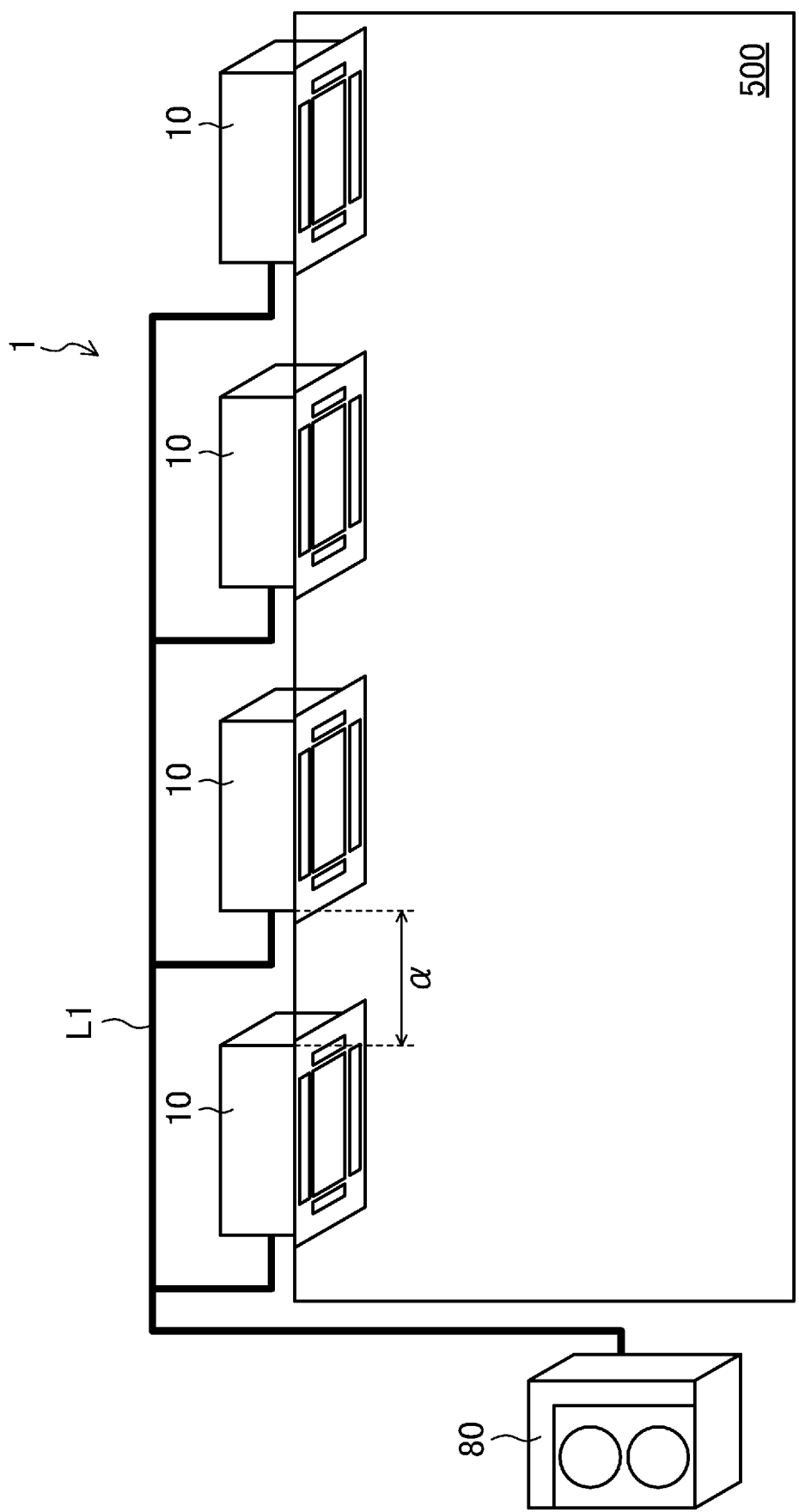
FIG. 1 is a diagram illustrating an external view of an air-conditioning system which has a plurality of indoor units installed in one indoor space.
Figure 6:
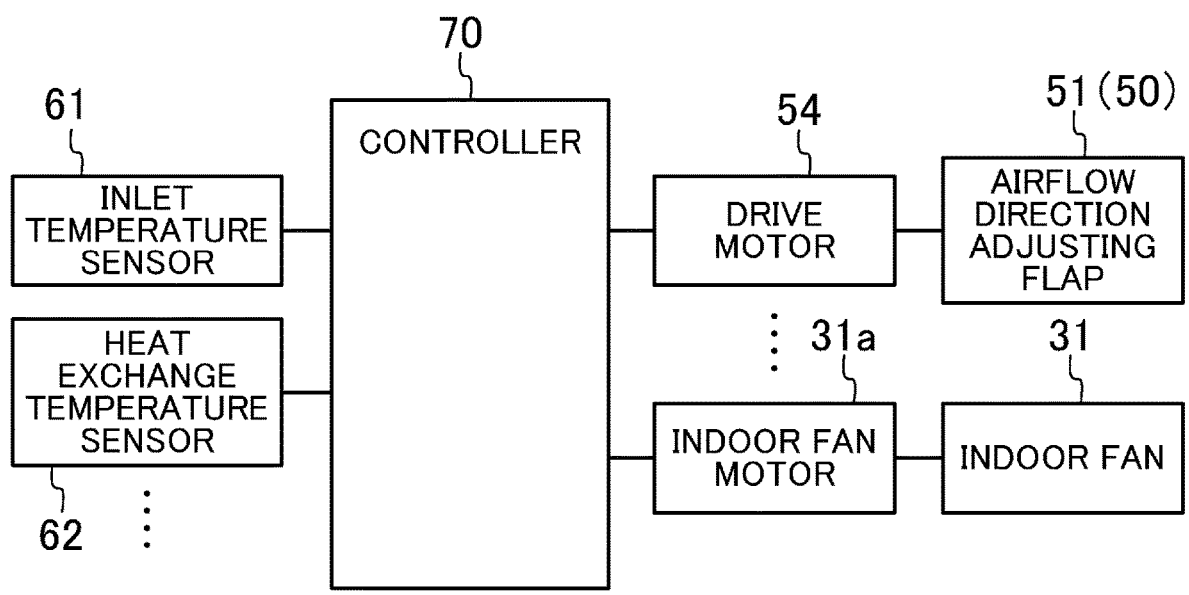
FIG. 6 is a block diagram schematically illustrating a controller and various devices connected to the controller.

An air-conditioning system (1) according to the present embodiment includes a plurality of indoor units (10) connected to one outdoor unit (80), in which an airflow direction adjusting flap (51) of each of the indoor units (10) is controlled. As illustrated in FIGS. 1 and 6, the air-conditioning system (1) includes a plurality of indoor units (10), one outdoor unit (80), and a controller (70). Each of the indoor units (10) is connected to the outdoor unit (80) by a communication pipe (L1), thereby forming a refrigerant circuit in which a refrigerant circulates to perform a refrigeration cycle.

Each of the plurality of indoor units (10) is embedded in the ceiling of the indoor space (500). The indoor units (10) are spaced from each other by a predetermined distance α in the horizontal direction, and supplies air into the indoor space (500). In the present embodiment, the indoor units (10) have the same configuration, which will be described later.

The outdoor unit (80) is placed outside the indoor space (500). Although not shown, the outdoor unit (80) includes a compressor, an outdoor fan, and other components.

The controller (70) is a microcomputer comprised, for example, of a CPU for computations and a memory for storing data, and is configured to control operation of each of the plurality of indoor units (10) and one outdoor unit (80). In the present embodiment, the manner in which the controller (70) is arranged is not particularly limited. The controller (70) may be configured as controllers independently provided in the indoor units (10) and the outdoor unit (80), or may be configured as a device independent from the indoor units (10) and the outdoor unit (80).

The controller (70) may be further provided with a dip switch used by an installation operator or a maintenance operator to set operation of the controller (70).

—Configuration of Indoor Unit—

As illustrated in FIGS. 1 to 5, the indoor unit (10) has a casing (20) (which corresponds to an indoor casing), an indoor fan (31), an indoor heat exchanger (32), a drain pan (33), a bell mouth (36), and an airflow direction adjusting flap (51).

<Casing>

Figure 2:
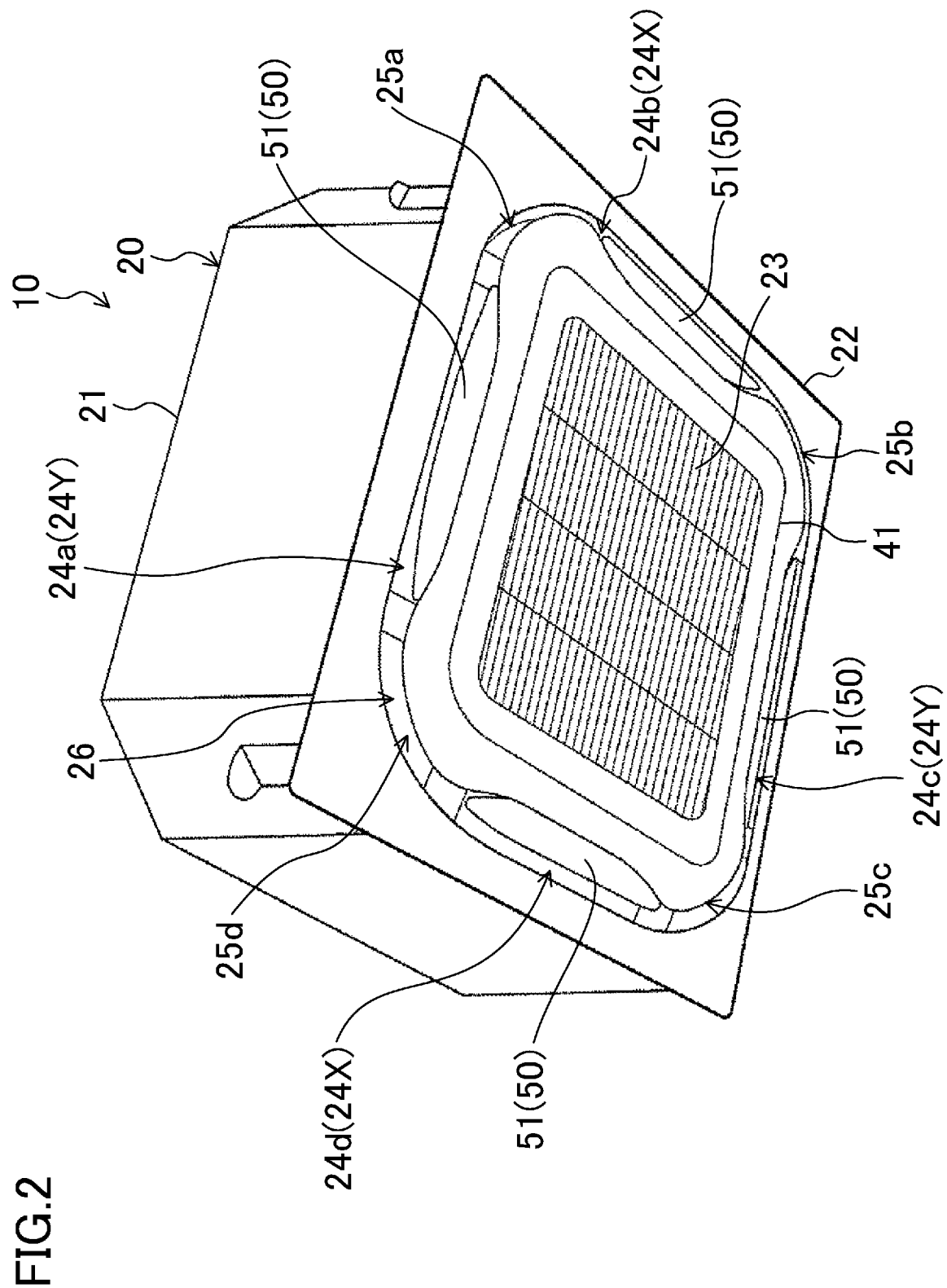
FIG. 2 is a diagram illustrating a perspective view of an indoor unit viewed obliquely from below.

As illustrated in FIG. 2, the casing (20) is provided in a ceiling (501) of the indoor space (500). The casing (20) is comprised of a casing body (21) and a decorative panel (22). The casing (20) houses the indoor fan (31), the indoor heat exchanger (32), the drain pan (33), and the bell mouth (36).

Figure 4:
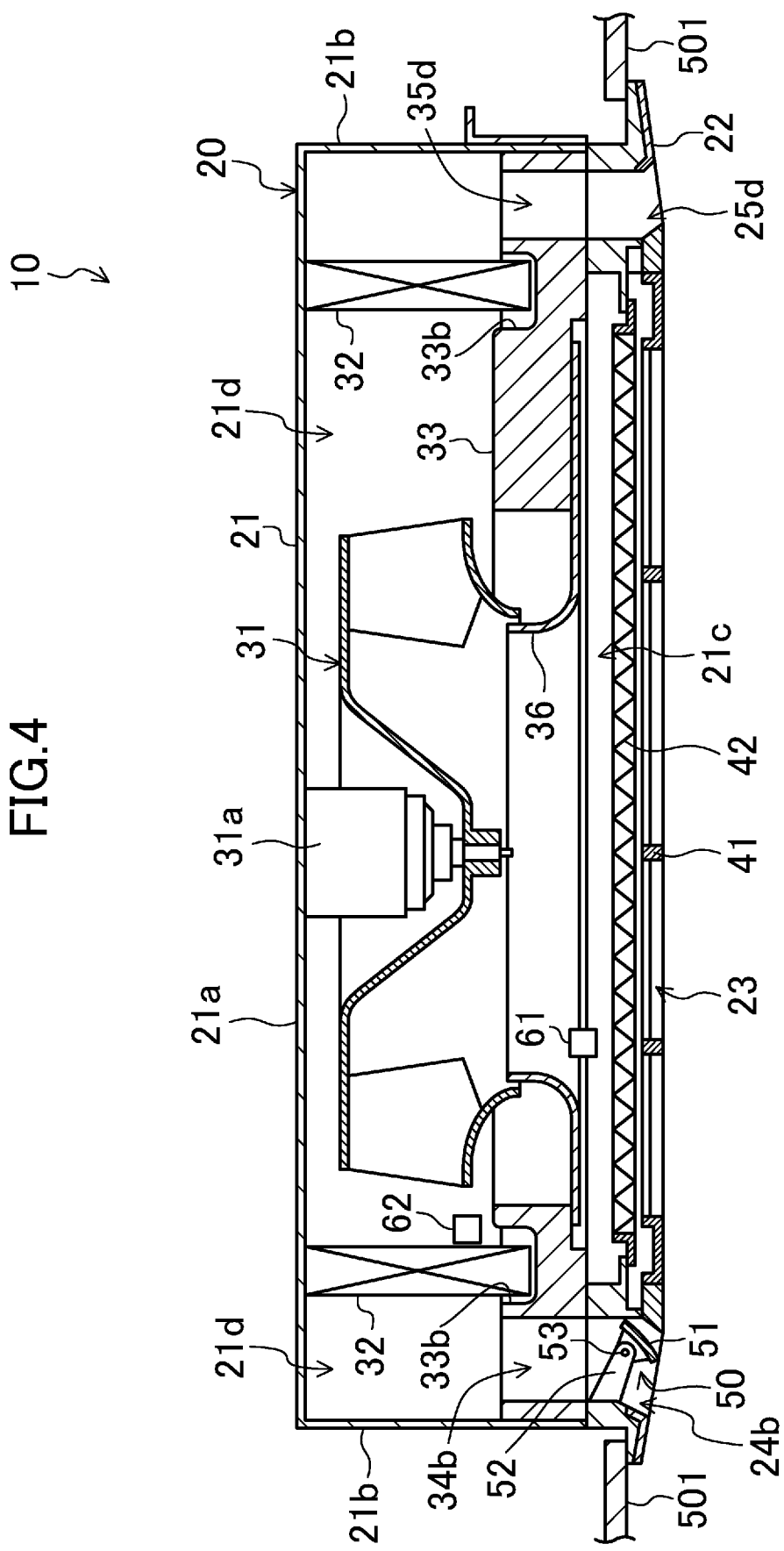
FIG. 4 is a diagram generally illustrating a cross-sectional view of the indoor unit taken along the line IV-O-IV shown in FIG. 3.

The casing body (21) is inserted in an opening of the ceiling of the indoor space (500). The casing body (21) has a generally rectangular parallelepiped box-like shape with its lower end open. As illustrated in FIG. 4, the casing body (21) includes a generally flat top panel (21a), and a side panel (21b) extending downward from a peripheral portion of the top panel (21a).

<Indoor Fan>

The indoor fan (31) is a centrifugal blower which draws air from below and expels the air radially outward. The indoor fan (31) is arranged at the center in the casing body (21). The indoor fan (31) is driven by an indoor fan motor (31a). The indoor fan motor (31a) is fixed to a central portion of the top panel (21a).

<Bell Mouth>

The bell mouth (36) is arranged below the indoor fan (31). The bell mouth (36) is a member for guiding air that has flowed into the casing (20) to the indoor fan (31). The bell mouth (36) and the drain pan (33) divide the internal space of the casing (20) into a primary space (21c) located on a suction side of the indoor fan (31) and a secondary space (21d) located on an air-blowing side of the indoor fan (31).

<Indoor Heat Exchanger>

Figure 3:
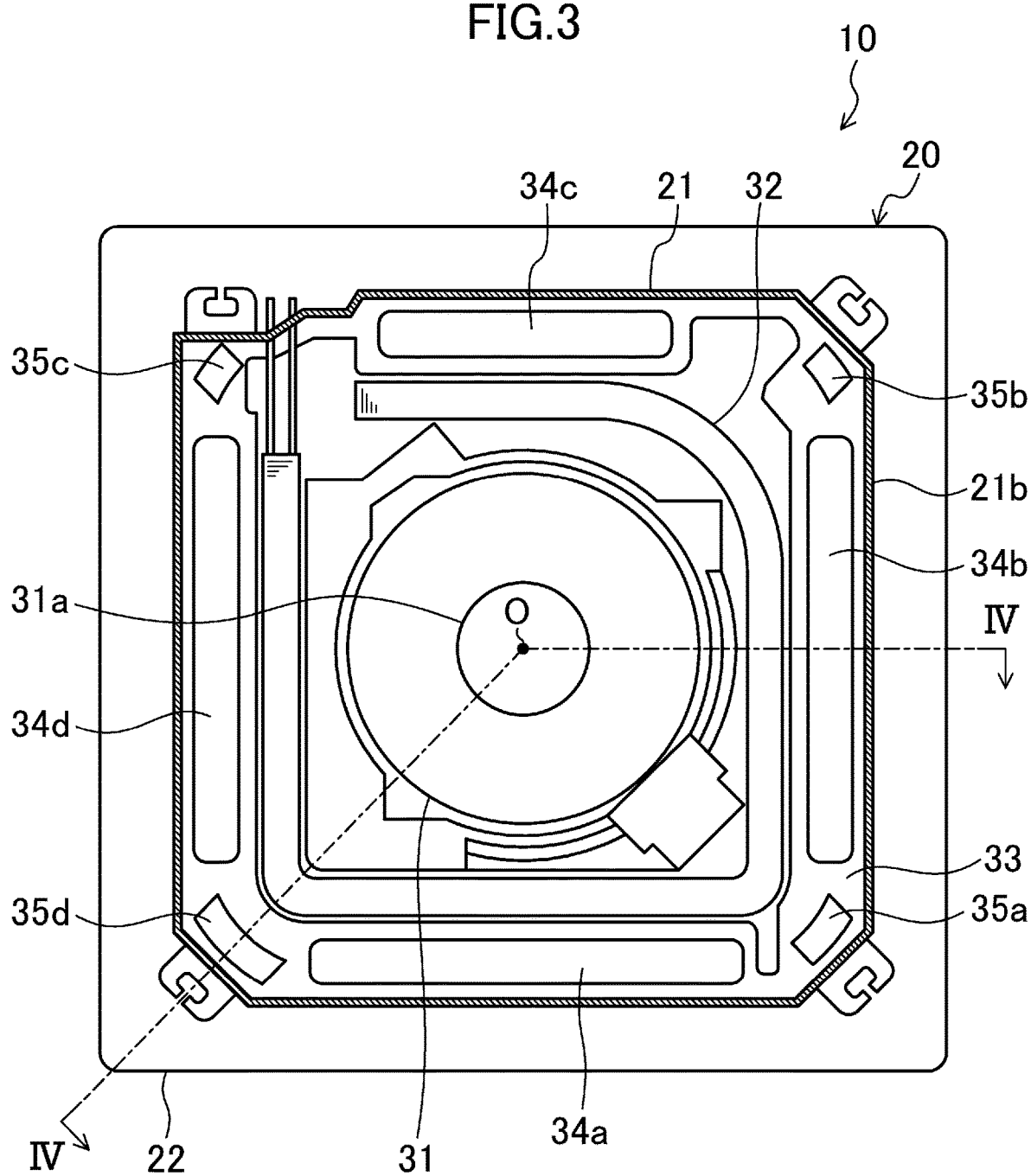
FIG. 3 is a diagram generally illustrating a plan view of the indoor unit from which a top panel of a casing body is omitted.

The indoor heat exchanger (32) is a so-called cross-fin-type fin-and-tube heat exchanger. As illustrated in FIG. 3, the indoor heat exchanger (32) is formed in a hollow rectangular shape in plan view, and is arranged to surround the indoor fan (31). That is, the indoor heat exchanger (32) is arranged in the secondary space (21d). The indoor heat exchanger (32) allows the air passing therethrough from the inside to the outside to exchange heat with the refrigerant in the refrigerant circuit.

<Drain Pan>

The drain pan (33) is a member made of so-called Styrofoam. As illustrated in FIG. 4, the drain pan (33) is arranged to block a lower end of the casing body (21). The drain pan (33) has an upper surface provided with a water receiving groove (33b) extending along a lower end of the indoor heat exchanger (32). A lower end portion of the indoor heat exchanger (32) is inserted in the water receiving groove (33b). The water receiving groove (33b) receives drain water generated in the indoor heat exchanger (32).

As illustrated in FIG. 3, the drain pan (33) is provided with four main outlet paths (34a to 34d) and four auxiliary outlet paths (35a to 35d). The main outlet paths (34a to 34d) and the auxiliary outlet paths (35a to 35d) are paths in which the air that has passed through the indoor heat exchanger (32) flows. The main outlet paths (34a to 34d) and the auxiliary outlet paths (35a to 35d) pass through the drain pan (33) in a vertical direction. The main outlet paths (34a to 34d) are through holes each having an elongated rectangular cross section. The main outlet paths (34a to 34d) are disposed along the four sides of the casing body (21). Each side of the casing body (21) is provided with one main outlet path. The auxiliary outlet paths (35a to 35d) are through holes each having a slightly curved rectangular cross section. The auxiliary outlet paths (35a to 35d) are disposed at the four corners of the casing body (21). Each corner of the casing body (21) is provided with one auxiliary outlet path. That is, the main outlet paths (34a to 34d) and the auxiliary outlet paths (35a to 35d) are alternately arranged along the peripheral edge of the drain pan (33).

<Decorative Panel>

The decorative panel (22) is a resin member formed into a thick rectangular plate-like shape. As illustrated in FIG. 2, the lower portion of the decorative panel (22) is in a square shape slightly larger than the top panel (21a) of the casing body (21). The decorative panel (22) is arranged to cover the lower end of the casing body (21). The lower surface of the decorative panel (22) serves as a lower surface of the casing (20) and is exposed to the indoor space (500).

Figure 5:
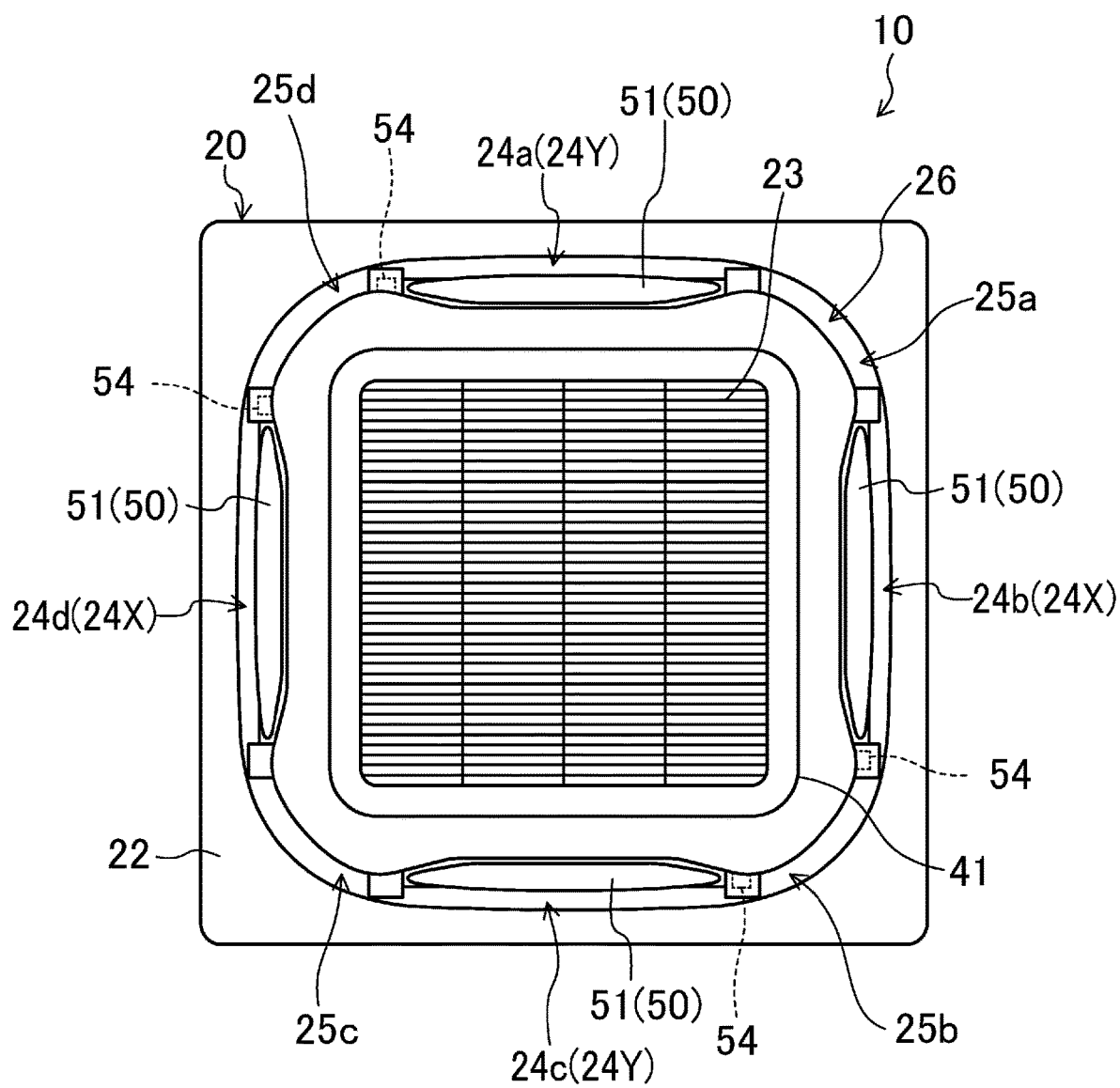
FIG. 5 is a diagram generally illustrating a bottom view of the indoor unit.

As illustrated in FIGS. 2, 4, and 5, a central portion of the decorative panel (22) has a single square inlet (23). The inlet (23) passes through the decorative panel (22) in the vertical direction and communicates with the primary space (21c) in the casing (20). The air drawn into the casing (20) flows into the primary space (21c) through the inlet (23). The inlet (23) is provided with a grid-like intake grille (41). An intake filter (42) is arranged above the intake grille (41).

The decorative panel (22) includes a substantially rectangular annular outlet (26) surrounding the inlet (23). As illustrated in FIG. 5, the outlet (26) is divided into four main outlet openings (24a to 24d) (which correspond to outlet openings) and four auxiliary outlet openings (25a to 25d).

Each of the main outlet openings (24a to 24d) has an elongated shape which corresponds to the cross sectional shape of each of the main outlet paths (34a to 34d). The main outlet openings (24a to 24d) are disposed along the four sides of the decorative panel (22). Each side of the decorative panel (22) is provided with one main outlet opening. In the indoor unit (10) of the present embodiment, the second main outlet opening (24b) and the fourth main outlet opening (24d) arranged along two sides, opposite to each other, of the decorative panel (22) constitute a first opening (24X). The first main outlet opening (24a) and the third main outlet opening (24c) constitute a second opening (24Y).

The main outlet openings (24a to 24d) of the decorative panel (22) correspond to the main outlet paths (34a to 34d) of the drain pan (33) on a one-on-one basis. Each of the main outlet openings (24a to 24d) communicates with a corresponding one of the main outlet paths (34a to 34d). That is, the first main outlet opening (24a) communicates with the first main outlet path (34a). The second main outlet opening (24b) communicates with the second main outlet path (34b). The third main outlet opening (24c) communicates with the third main outlet path (34c). The fourth main outlet opening (24d) communicates with the fourth main outlet path (34d).

Each of the auxiliary outlet openings (25a to 25d) is in the shape of a quarter of a circle. The auxiliary outlet openings (25a to 25d) are disposed at the four corners of the decorative panel (22). Each corner of the decorative panel (22) is provided with one auxiliary outlet opening. The auxiliary outlet openings (25a to 25d) of the decorative panel (22) correspond to the auxiliary outlet paths (35a to 35d) of the drain pan (33) on a one-on-one basis. Each of the auxiliary outlet openings (25a to 25d) communicates with a corresponding one of the auxiliary outlet paths (35a to 35d). That is, the first auxiliary outlet opening (25a) communicates with the first auxiliary outlet path (35a). The second auxiliary outlet opening (25b) communicates with the second auxiliary outlet path (35b). The third auxiliary outlet opening (25c) communicates with the third auxiliary outlet path (35c). The fourth auxiliary outlet opening (25d) communicates with the fourth auxiliary outlet path (35d).

<Airflow Direction Adjusting Flap>

As illustrated in FIG. 5, each of the main outlet openings (24a to 24d) is provided with an airflow direction adjusting flap (51). The airflow direction adjusting flap (51) is a member which adjusts the direction of supply airflow (that is, the direction of air coming from the main outlet openings (24a to 24d)).

The airflow direction adjusting flap (51) changes the direction of supply airflow upward and downward. That is, the airflow direction adjusting flap (51) changes the direction of supply airflow such that the angle between the direction of supply airflow and the horizontal direction changes.

The airflow direction adjusting flap (51) has an elongated plate-like shape extending from one longitudinal end to the other longitudinal end of the main outlet opening (24a to 24d) formed in the decorative panel (22). As illustrated in FIG. 4, the airflow direction adjusting flap (51) is supported by a support member (52) so as to be rotatable about a central shaft (53) of the airflow direction adjusting flap (51) extending in the longitudinal direction thereof. The airflow direction adjusting flap (51) is curved such that its lateral cross section (a cross section taken in a direction orthogonal to the longitudinal direction) forms a convex shape in a direction away from the central shaft (53) of swing movement.

As illustrated in FIG. 5, a drive motor (54) is coupled to each airflow direction adjusting flap (51). The airflow direction adjusting flap (51) is driven by the drive motor (54), and rotates about the central shaft (53) within a predetermined angle range. Although described in detail later, the airflow direction adjusting flap (51) can move to an airflow blocking position where the airflow direction adjusting flap (51) interrupts the flow of air passing through the main outlet opening (24a to 24d). The airflow direction adjusting flap (51) also functions as an airflow blocking mechanism (50) which blocks the supply airflow through the main outlet opening (24a to 24d).

<Various Sensors>

As illustrated in FIG. 4, the indoor unit (10) is further provided with an inlet temperature sensor (61) and a heat exchange temperature sensor (62).

The inlet temperature sensor (61) is disposed near the inlet of the bell mouth (36) in the primary space (21c). The inlet temperature sensor (61) senses a temperature of air flowing in the primary space (21c), that is, a temperature of air drawn into the casing body (21) from the indoor space (500) through the inlet (23).

The heat exchange temperature sensor (62) is disposed near the surface of the indoor heat exchanger (32). The heat exchange temperature sensor (62) senses a temperature of the surface of the indoor heat exchanger (32).

—General Description of Configuration and Control of Control Unit—

As illustrated in FIG. 6, the controller (70) is connected to the sensors (61, 62) included in each indoor units (10), the drive motor (54) of each airflow direction adjusting flap (51), the indoor fan motor (31a) of the indoor fan (31) or the like so as to be able to communicate with these components. Although not shown, the controller (70) is also connected to the compressor motor of the compressor included in the outdoor unit (80) so as to be able to communicate with the compressor motor. With the CPU reading and executing programs stored in the memory, the controller (70) controls the rotational speed of the indoor fan (31) and the rotational speed of the compressor motor. Further, the controller (70) is configured to be able to calculate an index indicating a load of the indoor space (500), using values measured by the sensors (61, 62).

The controller (70) actuates each drive motor (54) to control the positions of the airflow direction adjusting flaps (51) included in each of the indoor units (10) independently from one another, thereby controlling the airflow direction blown from each of the main outlet openings (24a to 24d). The controller (70) also controls the positions of the airflow direction adjusting flaps (51) of each of the indoor units (10) so that the respective indoor units (10) may perform a full supply operation or a partial supply operation. Further, the controller (70) controls the positions of the airflow direction adjusting flaps (51) provided at the respective main outlet openings (24a to 24d) so that the respective indoor units (10) may selectively perform a standard supply mode and an airflow rotation.

The indoor unit (10) for which the standard supply mode is selected performs only the full supply operation. That is, the indoor unit (10) for which the standard supply mode is selected performs the full supply operation all the time. The indoor unit (10) for which the airflow rotation is selected performs the partial supply operation and the full supply operation in an alternate manner, for example, and changes the main outlet openings (24a to 24d) through which air is supplied. Details about the control by the controller (70) will be described in "—Control Operation of Airflow Direction Adjusting Flap—" and "—Control While Adjacent Indoor Units Perform Partial Supply Operation—."

Note that the terms "heating operation" and the "cooling operation" used in the present embodiment include supplying conditioned air into the indoor space (500) by the operation of both of the compressor and the indoor fan (31), and also include a state in which the operation of the compressor is temporarily stopped while the operation of the indoor fan (31) continues (i.e., a circulation operation).

—Airflow in Indoor Unit—

The indoor fan (31) rotates during the operation of the indoor unit (10). The rotating indoor fan (31) allows the indoor air in the indoor space (500) to pass through the inlet (23) and flows in the primary space (21c) in the casing (20). The air which has flowed in the primary space (21c) is drawn by the indoor fan (31) and expelled into the secondary space (21d).

The air which has flowed into the secondary space (21d) is cooled or heated while passing through the indoor heat exchanger (32), and then flows separately into the four main outlet paths (34a to 34d) and four auxiliary outlet paths (35a to 35d). The air which has flowed into the main outlet paths (34a to 34d) is supplied to the indoor space (500) through the main outlet openings (24a to 24d). The air which has flowed into the auxiliary outlet paths (35a to 35d) is supplied to the indoor space (500) through the auxiliary outlet openings (25a to 25d).

That is, the indoor fan (31) generates the flow of air coming into the casing body (21) from the indoor space (500) through the inlet (23) and supplied back into the indoor space (500) through the outlet (26).

In the indoor unit (10) performing a cooling operation, the indoor heat exchanger (32) serves as an evaporator, so that the air before supplied into the indoor space (500) is cooled by the refrigerant while the air passes through the indoor heat exchanger (32). In the indoor unit (10) performing a heating operation, the indoor heat exchanger (32) serves as a condenser, so that the air before supplied into the indoor space (500) is heated by the refrigerant while the air passes through the indoor heat exchanger (32).

<Possible Positions of Airflow Direction Adjusting Flap>

Now, possible positions of each airflow direction adjusting flap (51) will be described.

As mentioned above, the airflow direction adjusting flap (51) changes the direction of supply airflow by rotating about the central shaft (53). The airflow direction adjusting flap (51) is movable between a horizontal airflow position illustrated in FIG. 7 and a downward airflow position illustrated in FIG. 8. The airflow direction adjusting flap (51) may further rotate from the downward airflow position illustrated in FIG. 8 and move to an airflow blocking position illustrated in FIG. 9.

Figure 7:
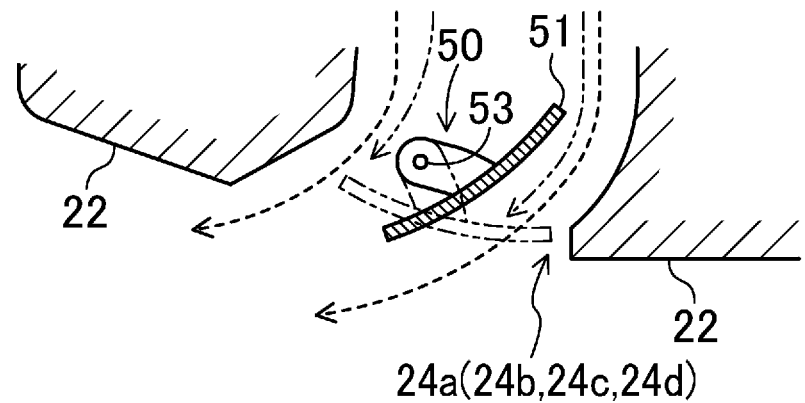
FIG. 7 is a diagram illustrating a cross-sectional view of a main part of a decorative panel, showing an airflow direction adjusting flap in a horizontal airflow position.

When the airflow direction adjusting flap (51) is in the horizontal airflow position illustrated in FIG. 7, the downward direction of the air coming from the main outlet path (34a to 34d) is changed to a lateral direction, and the supply airflow coming from the main outlet opening (24a to 24d) is in the horizontal supply state. In this case, the direction of supply airflow through the main outlet opening (24a to 24d) (that is, the direction of air coming from the main outlet opening (24a to 24d)) is set to be, for example, about 25° from the horizontal direction. That is, strictly saying, the direction of the supply airflow is angled slightly downward from the horizontal direction, but substantially the same as the horizontal direction. The horizontal supply state of the airflow allows the air coming from the main outlet opening (24*a* to 24*d*) to reach the wall of the indoor space (500).

The horizontal supply state is not limited to an airflow about 25° downward with respect to the horizontal direction, and may also include an airflow about 25° upward, that is, slightly upward, with respect to the horizontal direction. Further, the horizontal supply state can be appropriately set through the control using a remote controller or the like. For example, the airflow angle during the horizontal supply state may be set to an appropriate angle according to a purpose of operating the indoor unit (10), for example, according to a mode for preventing ceiling contamination. The horizontal supply state may include an airflow about 10°, about 15°, or about 30° downward with respect to the horizontal direction, because the horizontal supply state refers to a state in which air is supplied to the indoor space (500) approximately horizontally from the main outlet openings (24*a* to 24*d*).

Figure 8:
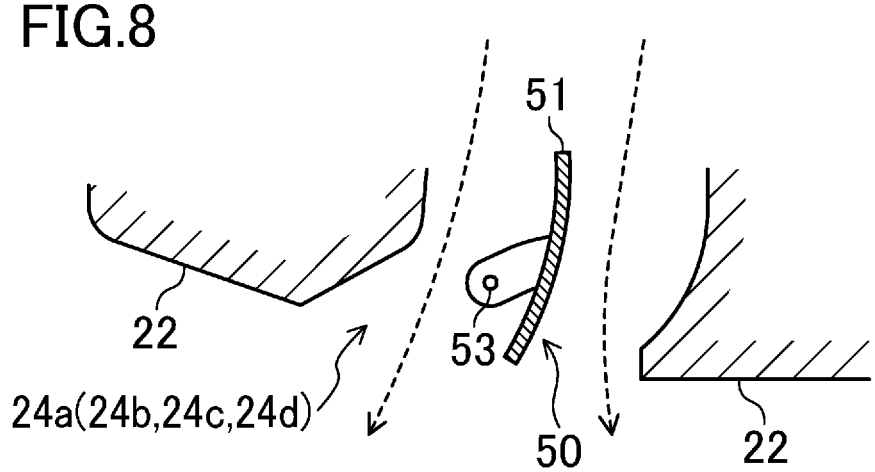
FIG. 8 is a diagram illustrating a cross-sectional view of the main part of the decorative panel, showing the airflow direction adjusting flap in a downward airflow position.

When the airflow direction adjusting flap (51) is in the downward airflow position illustrated in FIG. 8, the downward direction of the air coming from the main outlet path (34*a* to 34*d*) is maintained substantially as it is, and the supply airflow coming from the main outlet opening (24*a* to 24*d*) is directed downward. In this case, strictly saying, the direction of the supply airflow is slightly angled from the vertical direction, that is, obliquely downward, away from the inlet (23).

Figure 9:
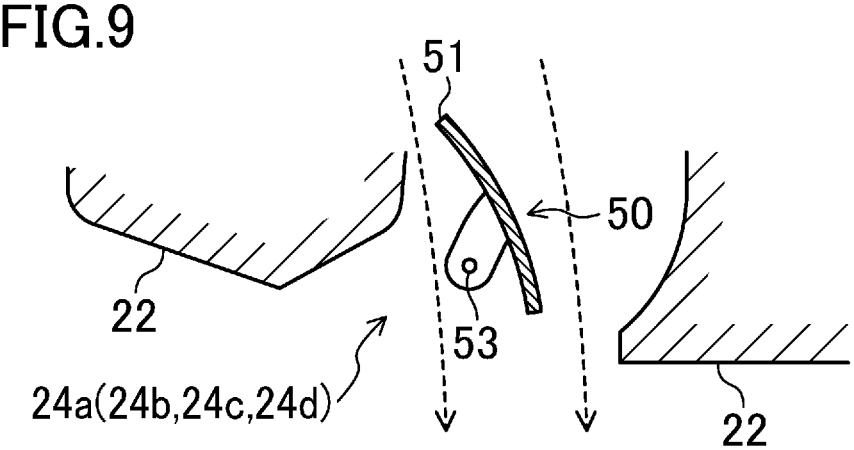
FIG. 9 is a diagram illustrating a cross-sectional view of the main part of the decorative panel, showing the airflow direction adjusting flap in an airflow blocking position.

When the airflow direction adjusting flap (51) is in an airflow blocking position illustrated in FIG. 9, a large portion of the main outlet opening (24*a* to 24*d*) is closed by the airflow direction adjusting flap (51), and the downward direction of the air coming from the main outlet path (34*a* to 34*d*) is changed toward the inlet (23). In this case, the pressure loss of the air passing through the main outlet opening (24*a* to 24*d*) increases, and the total value of the flow rates of air (i.e., the volume of air) passing through all of the main outlet openings (24*a* to 24*d*) decreases. However, when the positions of only some of the airflow direction adjusting flaps (51) of any one of the indoor units (10) are changed from the state where all of the airflow direction adjusting flaps (51) take the positions illustrated in FIG. 7 or 8 to the airflow blocking positions, the flow rate of air (i.e., the volume of air) passing through each of the main outlet openings (24*a* to 24*d*) corresponding to the rest of the airflow direction adjusting flaps (51) taking the positions illustrated in FIG. 7 or 8 are increased, compared to the flow rate prior to the changes of the positions. That is, when the positions of some of all the airflow direction adjusting flaps (51) are changed from the positions illustrated in FIG. 7 or 8 to the airflow blocking positions (FIG. 9), the overall amount of air supplied from one indoor unit (10) is reduced, but the volume of air supplied through the main outlet openings (24*a* to 24*d*) corresponding to the airflow direction adjusting flaps (51) still taking the positions illustrated in FIG. 7 or 8 increases after the change of the positions.

In the airflow blocking position, the air is supplied toward the inlet (23) from the main outlet opening (24*a* to 24*d*). Thus, the air coming from the main outlet opening (24*a* to 24*d*) is immediately sucked in the inlet (23). That is, substantially no air is supplied to the indoor space (500) through the main outlet opening (24*a* to 24*d*) where the airflow direction adjusting flap (51) is taking the airflow blocking position.

—Control Operation of Airflow Direction Adjusting Flap—
<Airflow Rotation>

During the airflow rotation, the controller (70) keeps the rotational speed of the indoor fan (31) substantially at the maximum value. The airflow rotation will be described in detail below. For ease of explanation, one indoor unit (10) is taken as an example.

The airflow rotation according to the present embodiment includes three modes, namely, a first supply mode, a second supply mode, and a third supply mode. In which mode the airflow rotation is performed is preferably set by an installation operator or a maintenance operator of the indoor unit (10) by means of a remote controller or a dip switch (not shown).

(First Supply Mode)

Figure 10:
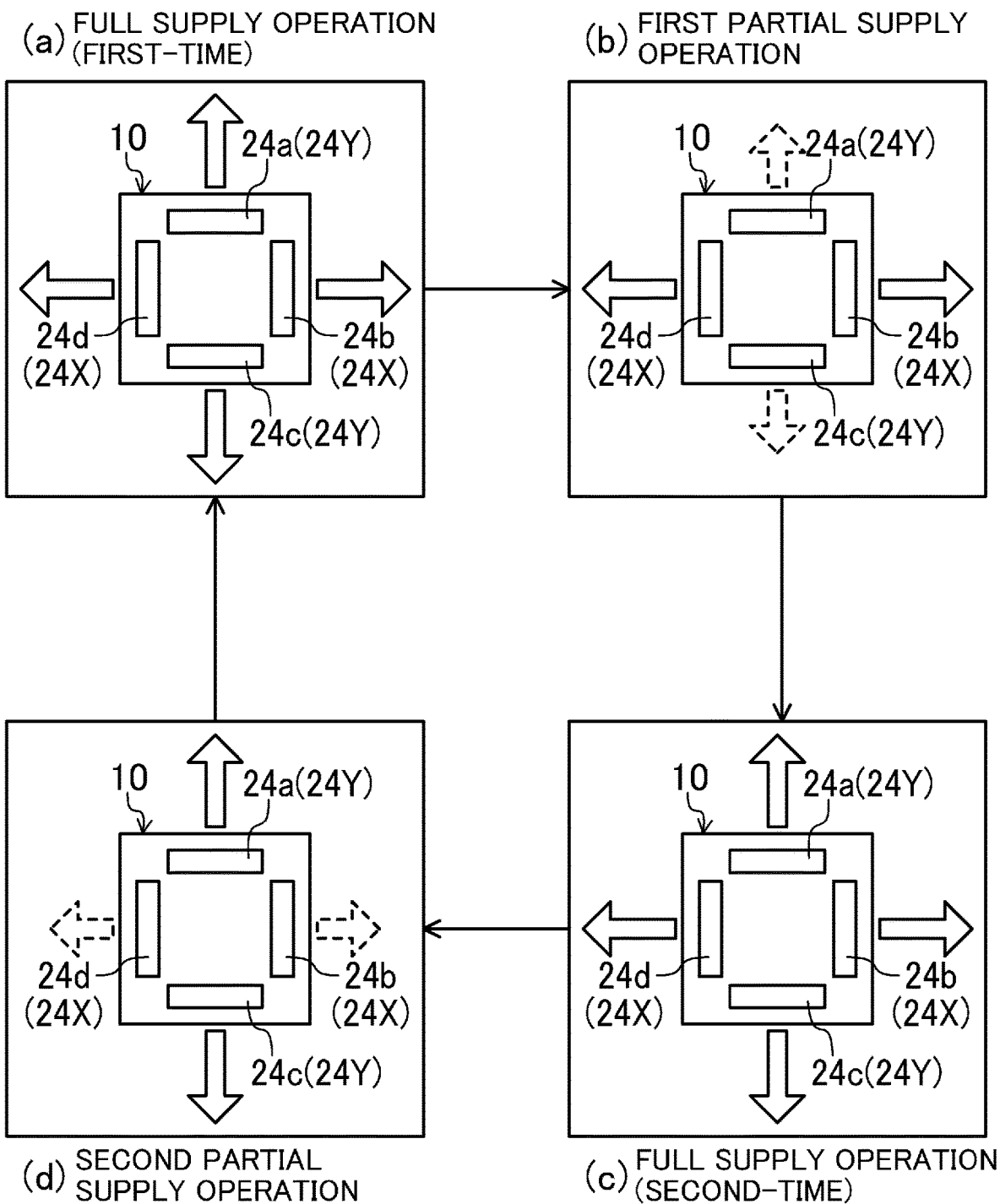
FIG. 10 is a diagram for explaining one cycle of a first supply mode, schematically showing a lower surface of the indoor unit in each operation.

As illustrated in FIG. 10, the full supply operation and the partial supply operation are alternately performed in one cycle of the first supply mode. The partial supply operation of FIG. 10 includes two different combinations of the main outlet openings (24*a* to 24*d*), of one indoor unit (10), through which air is blown (specifically, a first partial supply operation and a second partial supply operation). In the first supply mode of FIG. 10, a first-time full supply operation, the first partial supply operation, a second-time full supply operation, and the second partial supply operation are sequentially performed in the stated order.

<First Supply Mode in Heating Operation>

In the full supply operation during the heating operation, the controller (70) sets the airflow direction adjusting flaps (51) of all the main outlet openings (24*a* to 24*d*) to the downward airflow positions. In this setting, warm air is blown downward and is supplied to the indoor space (500) from the four main outlet openings (24*a* to 24*d*).

In the first partial supply operation during the heating operation, the controller (70) sets the airflow direction adjusting flaps (51) of the two main outlet openings (24*b*, 24*d*) constituting the first opening (24X) to the horizontal airflow position, and the airflow direction adjusting flaps (51) of the main outlet openings (24*a*, 24*c*) constituting the second opening (24Y) to the airflow blocking position. In this setting, air is blown substantially in the horizontal direction from the first opening (24X) at a higher speed than in the full supply operation, and substantially no air is blown from the second opening (24Y).

In the second partial supply operation during the heating operation, the controller (70) sets the airflow direction adjusting flaps (51) of the second opening (24Y) to the horizontal airflow position, and the airflow direction adjusting flaps (51) of first opening (24X) to the airflow blocking position. In this setting, air is blown substantially in the horizontal direction from the second opening (24Y) at a higher speed than in the full supply operation, and substantially no air is blown from the first opening (24X).

During the first supply mode in the heating operation, air is blown from the auxiliary outlet openings (25*a* to 25*d*) all the time.

Further, the duration of each of the full supply operation, the first partial supply operation, and the second partial supply operation may be the same (e.g., 120 seconds) or may different from one another.

<First Supply Mode in Cooling Operation>

In the full supply operation during the cooling operation, the controller (70) makes the airflow direction adjusting flaps (51) of all the main outlet openings (24*a* to 24*d*) move between the horizontal airflow position and the downward airflow position. In this operation, cool air is supplied into the indoor space (500) from the four main outlet openings (24a to 24d), and the direction of the supply airflow changes. Note that, in the full supply operation during the cooling operation, the lower limit of the moving range of the airflow direction adjusting flap (51) may be set to a position higher than the downward airflow position (i.e., a position closer to the horizontal airflow position).

The first partial supply operation during the cooling operation is similar to the above-described first partial supply operation during the heating operation, except that the temperature of air to be supplied is different. The second partial supply operation during the cooling operation is similar to the above-described second partial supply operation during the heating operation.

During the first supply mode in the cooling operation, air is blown from the auxiliary outlet openings (25a to 25d) all the time.

Further, the duration of each of the full supply operation, the first partial supply operation, and the second partial supply operation may be the same. Further, it is preferable that the duration of each of the first- and second-time full supply operations be set to be longer than the duration of each of the first and second partial supply operations. For example, the duration of each of the first- and second-time full supply operations is set to be 600 seconds, and the duration of each of the first and second partial supply operations is set to be 120 seconds.

<Second Supply Mode>

As illustrated in FIG. 11, in one cycle of the second supply mode, one full supply operation and one first partial supply operation as the partial supply operation are alternately performed.

<Second Supply Mode in Heating Operation>

In the full supply operation during the heating operation, the controller (70) sets the airflow direction adjusting flaps (51) of all the main outlet openings (24a to 24d) to the downward airflow positions. That is, the full supply operation in the second supply mode during the heating operation is similar to the full supply operation in the first supply mode during the heating operation.

In the first partial supply operation during the heating operation, the controller (70) sets the airflow direction adjusting flaps (51) of the first opening (24X) to the horizontal airflow position, and the airflow direction adjusting flaps (51) of the second opening (24Y) to the airflow blocking position. That is, the first supply operation in the second supply mode during the heating operation is similar to the first supply operation in the first supply mode during the heating operation.

Similarly to the first supply mode during the heating operation, the duration of each of the full supply operation and the first partial supply operation may be or may not be the same as each other.

<Second Supply Mode in Cooling Operation>

In the full supply operation during the cooling operation, the controller (70) makes the airflow direction adjusting flaps (51) of all the main outlet openings (24a to 24d) move between the horizontal airflow position and the downward airflow position. That is, the full supply operation in the second supply mode during the cooling operation is similar to the full supply operation in the first supply mode during the cooling operation.

In the first partial supply operation during the cooling operation, the controller (70) sets the airflow direction adjusting flaps (51) of the first opening (24X) to the horizontal airflow position, and the airflow direction adjusting flaps (51) of the second opening (24Y) to the airflow blocking position. That is, the first partial supply operation in the second supply mode during the cooling operation is similar to the first partial supply operation in the first supply mode during the heating operation.

Similarly to the first supply mode during the cooling operation, the duration of each of the full supply operation and the first partial supply operation may be the same as each other, or the duration of the full supply operation may be set to be longer than the duration of the first partial supply operation.

<Third Supply Mode>

As illustrated in FIG. 12, in one cycle of the third supply mode, one full supply operation and one second partial supply operation as the partial supply operation are alternately performed.

<Third Supply Mode in Heating Operation>

In the full supply operation during the heating operation, the controller (70) sets the airflow direction adjusting flaps (51) of all the main outlet openings (24a to 24d) to the downward airflow positions. That is, the full supply operation in the third supply mode during the heating operation is similar to the full supply operation in the first supply mode during the heating operation.

In the second partial supply operation during the heating operation, the controller (70) sets the airflow direction adjusting flaps (51) of the second opening (24Y) to the horizontal airflow position, and the airflow direction adjusting flaps (51) of first opening (24X) to the airflow blocking position. That is, the second partial supply operation in the third supply mode during the heating operation is similar to the second partial supply operation in the first supply mode during the heating operation.

Similarly to the first supply mode during the heating operation, the duration of each of the full supply operation and the second partial supply operation may or may not be the same as each other.

<Third Supply Mode in Cooling Operation>

In the full supply operation during the cooling operation, the controller (70) makes the airflow direction adjusting flaps (51) of all the main outlet openings (24a to 24d) move between the horizontal airflow position and the downward airflow position. That is, the full supply operation in the third supply mode during the cooling operation is similar to the full supply operation in the first supply mode during the heating operation.

In the second partial supply operation during the cooling operation, the controller (70) sets the airflow direction adjusting flaps (51) of the second opening (24Y) to the horizontal airflow position, and the airflow direction adjusting flaps (51) of the first opening (24X) to the airflow blocking position. That is, the first partial supply operation in the third supply mode during the cooling operation is similar to the first partial supply operation in the first supply mode during the heating operation.

Similarly to the first supply mode during the cooling operation, the duration of each of the full supply operation and the second partial supply operation may be the same as each other, or the duration of the full supply operation may be set to be longer than the duration of the second partial supply operation.

As described above, the partial supply operation includes two patterns, namely, the first partial supply operation and the second partial supply operation. Both of these operations can be said to be the operations in which air currents supplied from one or some of the main outlet openings (24a to 24d) are blocked by the airflow direction adjusting flaps (51) serving as the airflow blocking mechanism (50), thereby increasing the speed of air currents supplied from the rest of the main outlet openings (24a to 24d).

—Control while Adjacent Indoor Units Perform Partial Supply Operation—

A state in which adjacent indoor units (10) perform the partial supply operations, which can be said to be a characteristic of the present embodiment, will be described with reference to FIGS. 13 to 15.

Figure 13:
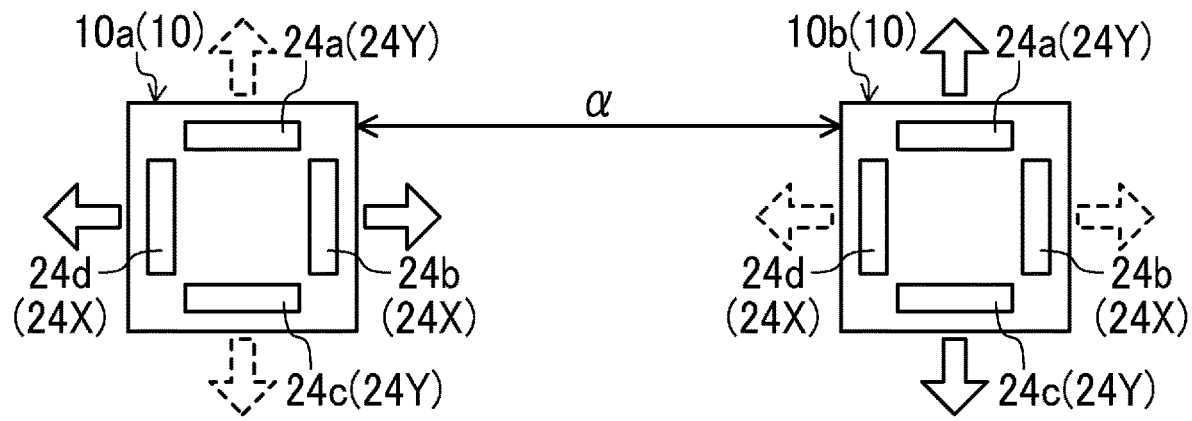
FIG. 13 is a diagram schematically illustrating lower surfaces of indoor units adjacent to each other, one of which is performing a first partial supply operation, and the other performing a second partial supply operation.
Figure 14:
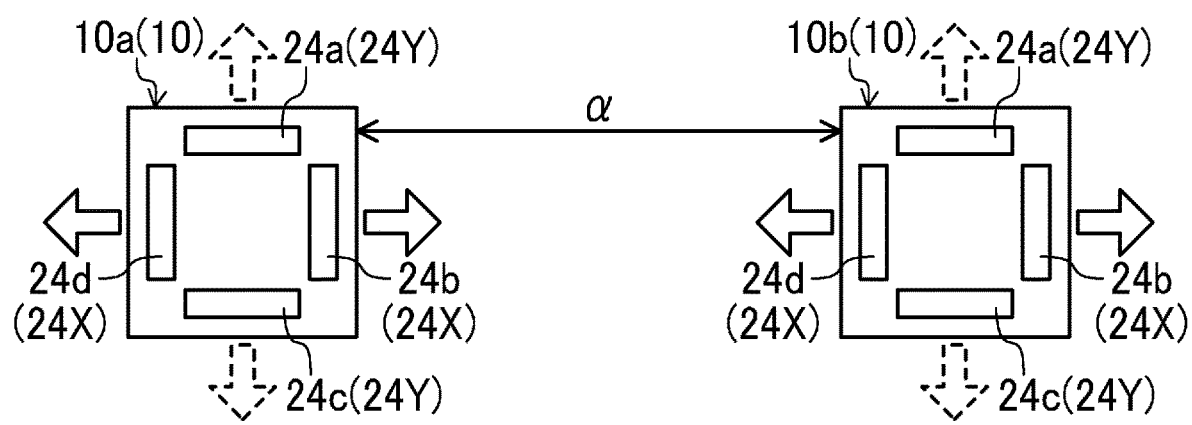
FIG. 14 is a diagram schematically illustrating lower surfaces of indoor units adjacent to each other, both of which are performing a first partial supply operation.
Figure 15:
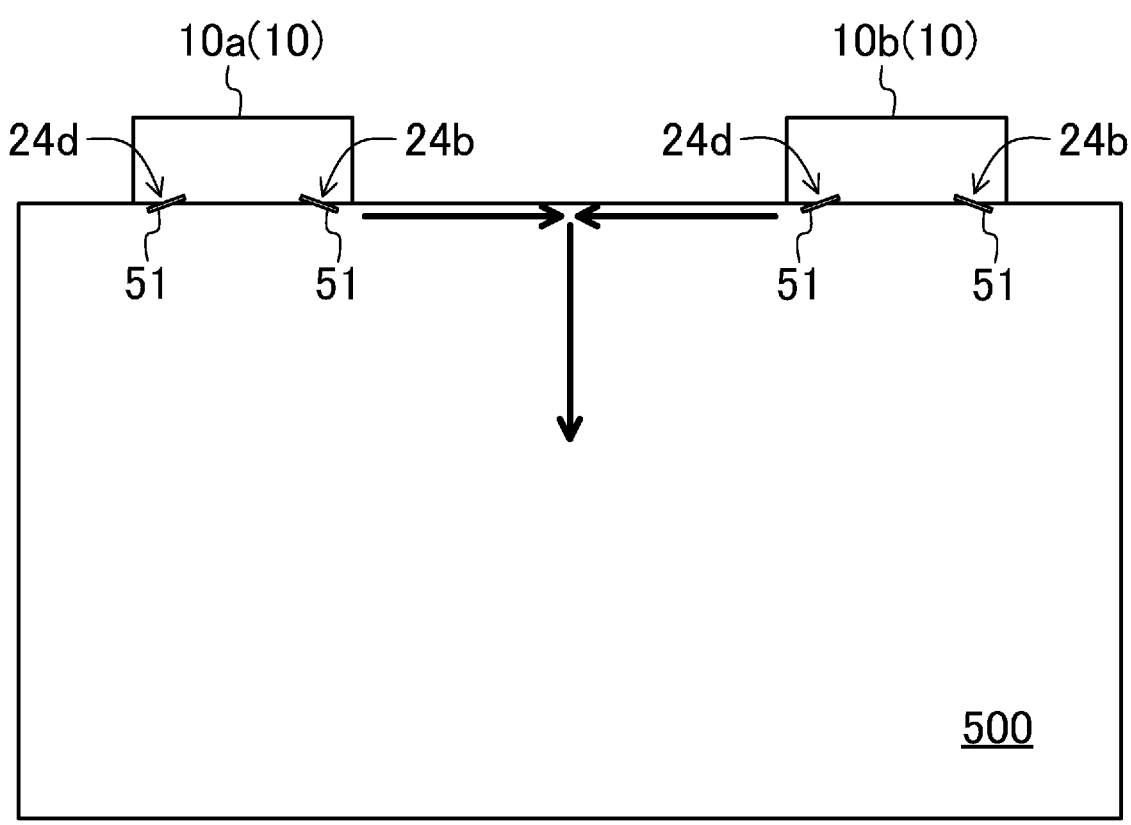
FIG. 15 is a diagram for describing an air current blown into the indoor space from both of the indoor units of FIG. 14.

For ease of explanation, FIGS. 13 to 15 show only two indoor units (10) adjacent to each other with a predetermined distance α interposed therebetween. In FIGS. 13 to 15, the two indoor units (10) are designated by different reference signs "10a" and "10b" to differentiate between the two indoor units (10).

Suppose that the indoor units (10a, 10b) are performing the airflow rotations in different modes (any one of the first, second, and third supply modes). In some situations, as illustrated in FIG. 13, the indoor unit (10a) and the indoor unit (10b) perform the first partial supply operation and the second partial supply operation, respectively, at the same timing. In this case, regardless of whether in the heating operation or in the cooling operation, the air current is blown in the horizontal direction from the main outlet opening (24b) of the indoor unit (10a), and no air current is blown from the main outlet opening (24d), of the indoor unit (10b), which faces the main outlet opening (24b) of the indoor unit (10a) with a predetermined distance α interposed therebetween because the airflow direction adjusting flap (51) of the main outlet opening (24d) takes the airflow blocking position. In this situation, the air current that has just been blown from the main outlet opening (24b) of the indoor unit (10a) may be drawn into the casing (20) of the adjacent indoor unit (10b) through the inlet (23) of the indoor unit (10b), and may not contribute to the temperature control of the indoor space (500).

To avoid this, the controller (70) of the present embodiment carries out control such that air currents are blown from both of the main outlet opening (24b) of the indoor unit (10a) and the main outlet openings (24d) of the indoor unit (10b), the main outlet openings facing each other with the predetermined distance α interposed therebetween, while both of the indoor units (10a, 10b) adjacent to each other are performing the partial supply operation.

Specifically, it is preferable that the modes of the airflow rotation for the adjacent indoor units (10a, 10b) be set to the same mode. That is, a remote controller, a dip switch, or the like not shown is configured such that the modes for the plurality of indoor units (10a, 10b) installed in the indoor space (500) be set to the same one mode. For example, if the indoor unit (10a) is set to the second supply mode, the indoor unit (10b) is also set to the second supply mode.

The controller (70) synchronizes the operations of the indoor units (10a, 10b) so that when the indoor unit (10a) performs the second partial supply operation, the indoor unit (10b) also performs the second part supply operation, and that when the indoor unit (10a) performs the full supply operation, the indoor unit (10b) also performs the full supply operation. That is, the controller (70) carries out control such that the indoor units (10a, 10b) perform the same operation at the same timing.

FIG. 14 illustrates a case in which the indoor units (10a, 10b) perform the first partial supply operation at the same timing. Thus, an air current is blown in the horizontal direction from the main outlet opening (24b) of the indoor unit (10a) toward the adjacent indoor unit (10b). From the main outlet opening (24d) of the indoor unit (10b), which faces the main outlet opening (24b) of the indoor unit (10a) with the predetermined distance α interposed therebetween, an air current is blown in the horizontal direction toward the adjacent indoor unit (10a). On the other hand, each of the main outlet openings (24a, 24c), of the indoor units (10a, 10b), which do not face each other takes the airflow blocking position.

Further, the controller (70) finely adjusts the volume and speed of each of the air currents blown from the main outlet opening (24b) of the indoor unit (10a) and from the main outlet opening (24d) of the indoor unit (10b) so that the air currents may collide with each other. FIG. 15 illustrates a case in which the air current blown in the horizontal direction from the main outlet opening (24b) of the indoor unit (10a) toward the indoor unit (10b) and the air current blown in the horizontal direction from the main outlet opening (24d) of the indoor unit (10b) toward the indoor unit (10a) collide with each other at approximately a middle point between the indoor unit (10a) and the indoor unit (10b). The air currents which have collided with each other are forced to flow down toward the floor of the indoor space (500). It is therefore less likely that the air current that has just been blown from the main outlet opening (24b) of the indoor unit (10a) or the main outlet opening (24d) of the indoor unit (10b) is immediately drawn into the adjacent indoor unit (10a, 10b).

FIGS. 14 and 15 illustrate cases in which both of the indoor units (10a, 10b) perform the first partial supply operation. Similarly to the these cases, the controller (70) carries out control such that air currents are blown from the main outlet openings (24a to 24d) facing each other with the predetermined distance α interposed therebetween to make the air currents collide with each other, also in a case in which both of the indoor units (10a, 10b) perform the second partial supply operation.

Advantages of Embodiment

In the present embodiment, as illustrated in FIGS. 14 and 15, the air currents blown from the indoor units (10a, 10b) adjacent to each other through the main outlet openings (24b) and (24d) which face each other with the predetermined distance α interposed therebetween are made to collide with each other in the partial supply operations. The air currents which have collided with each other are forced to flow down toward the floor of the indoor space (500). It is thus possible to reduce the occurrence of the phenomenon in which an air current that has just been blown from the main outlet opening (24b, 24d) is immediately drawn into an adjacent indoor unit (10a, 10b) through the inlet (23) of the casing (20).

Further, in the present embodiment, the airflow rotation in which the full supply operation and the partial supply operation are alternately performed is carried out as illustrated in FIGS. 10 to 12. In the partial supply operation of the airflow rotation, control is carried out to make the air currents, blown from the main outlet openings (24b, 24d) facing each other with the predetermined distance α interposed therebetween, collide with each other. It is thus possible to reduce the occurrence of the phenomenon in which an air current that has just been blown from the main outlet opening (24b, 24d) is immediately drawn into an adjacent indoor unit (10a, 10b) in the partial supply operation. Further, the airflow rotation allows the conditioned air to be supplied to an area in the indoor space (500) which is relatively close to the indoor unit (10) and an area in the indoor space (500) which is relatively far from the indoor unit (10), and thus to reduce a difference in the temperature among areas in the indoor space (500).

In the present embodiment, the airflow direction adjusting flap (51) for changing the direction of the supply airflow in the vertical direction also serves as an airflow blocking mechanism (50) for blocking the flow of air. That is, the airflow direction adjusting flap (51) taking a predetermined position blocks the air coming from the main outlet openings (24a to 24d).

Further, in the present embodiment, the casing (20) of each of the indoor units (10) has a rectangular lower surface (22), and the main outlet openings (24a to 24d) are arranged along the respective four sides of the outlet opening (22).

First Variation of Embodiment

Each of the indoor units (10) may be configured to be able to perform, as the airflow rotation, a fourth supply mode illustrated in FIG. 16 instead of the first supply mode, or in addition to the first to third supply modes. In the fourth supply mode, the full supply operation, the first partial supply operation, and the second partial supply operation are repeatedly performed in the stated order. In the fourth supply mode, too, control is carried out to make the air currents collide with each other in the first and second partial supply operations.

Second Variation of Embodiment

Each of the indoor units (10) may supply air into the indoor space (500) from adjacent main outlet openings (24a to 24d) during the first and second partial supply operations. Specifically, the main outlet openings (24a, 24b) may constitute a first opening (24X), and the main outlet openings (24c, 24d) may constitute a second opening (24Y). In the first and second partial supply operations, too, control is carried out to make the air currents collide with each other.

Third Variation of Embodiment

Figure 17:
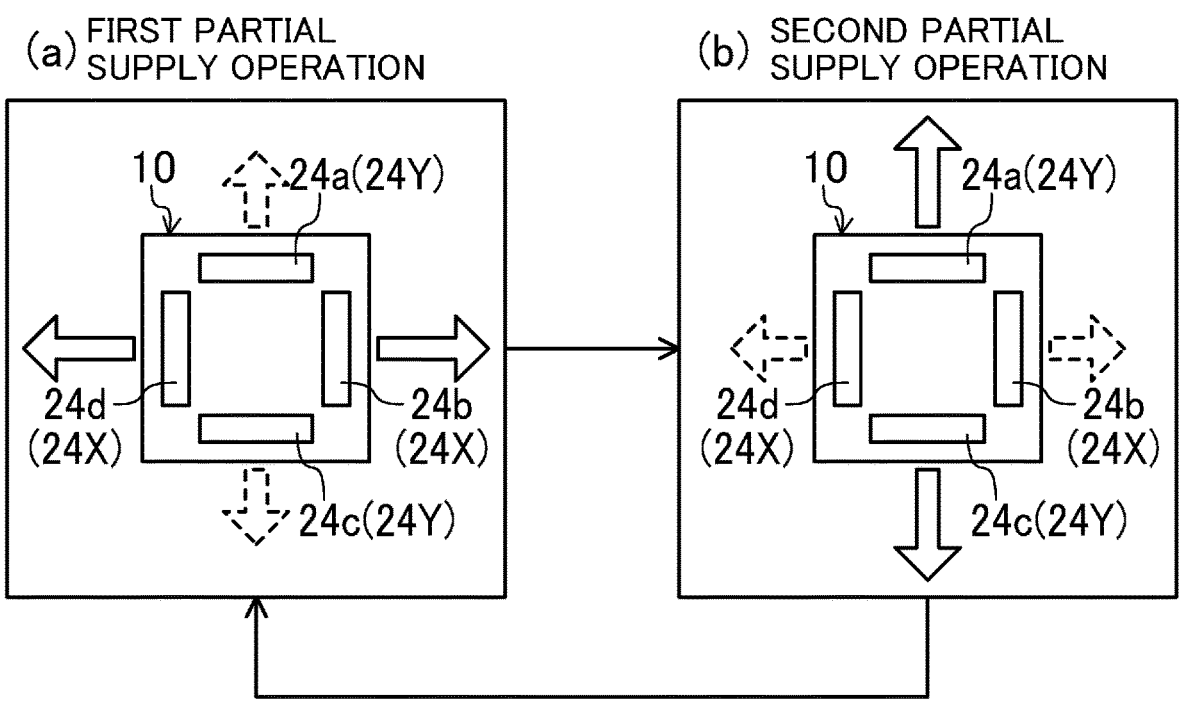
FIG. 17 is a diagram for explaining one cycle of a fifth supply mode according to a third variation, schematically showing a lower surface of the indoor unit in each operation.

Each of the indoor units (10) may be configured to be able to perform, as the airflow rotation, a fifth supply mode, in which the first and second partial supply operations are alternately performed as illustrated in FIG. 17, in addition to the first to third supply modes. In the fifth supply mode, too, control is carried out to make the air currents collide with each other in the first and second partial supply operations.

Fourth Variation of Embodiment

The controller (70) may be configured to automatically select various supply modes as the airflow rotation. For example, the controller (70) may determine which supply modes are to be performed as the airflow rotation, using an actual temperature of the floor of the indoor space (500).

Fifth Variation of Embodiment

The angle of the airflow direction adjusting flap (51), while taking the horizontal airflow position, with respect to the horizontal direction may be finely adjusted as necessary, according to the distance from the location of the indoor unit (10) to the wall surface of the indoor space (500), so that the air coming from the main outlet opening (24a to 24d) can reach the vicinity of the wall of the indoor space (500). The distance from the location of the indoor unit (10) to the wall surface of the indoor space (500) may be measured and input to the indoor controller (70) at the installation of the indoor unit (10) in the indoor space (500) by a worker who installs the indoor unit (10). Alternatively, a sensor for detecting the distance may be attached to the indoor unit (10) in advance.

Sixth Variation of Embodiment

The indoor unit (10) is not limited to the ceiling embedded type. The indoor unit (10) may be of a ceiling suspended type or of a wall hanging type.

Note that in the ceiling mounted type and the wall hanging type, air may be supplied slightly upward, using the Coanda effect, with respect to the horizontal air current in the case of the ceiling embedded type during the operation in the airflow rotation.

The indoor unit may be of a type that does not have the auxiliary outlet openings (25a to 25d).

Seventh Variation of Embodiment

The number of the main outlet openings (24a to 24d) is not limited to four, as long as a plurality of main outlet openings are provided.

Eighth Variation of Embodiment

The indoor unit (10) may have a shutter for closing the main outlet opening (24a to 24d) as an airflow blocking mechanism in addition to the airflow direction adjusting flap (51). Preferably, in this case, the airflow blocking mechanism is provided to correspond to each of the main outlet openings (24a to 24d). For example, the airflow blocking mechanism may be configured as an open/close shutter.

Ninth Variation of Embodiment

The number of indoor units (10) included in the air-conditioning system (1) is not limited to four, as long as two or more indoor units are provided.

INDUSTRIAL APPLICABILITY

As can be seen from the foregoing description, the present invention is useful as an air-conditioning system having a plurality of indoor units installed in a ceiling.

DESCRIPTION OF REFERENCE CHARACTERS

1 Air-Conditioning System
10 Indoor Unit
20 Casing (Indoor Casing)
24a to 24d Main Outlet Opening (Outlet Opening)
50 Airflow Blocking Mechanism
51 Airflow Direction Adjusting Flap
70 Controller
500 Indoor Space

The invention claimed is:
1. An air-conditioning system, comprising:
a plurality of indoor units installed in a ceiling of an indoor space such that adjacent indoor units are positioned a predetermined distance apart, the plurality of indoor units each having
an indoor casing provided with a plurality of outlet openings,
a plurality of airflow direction adjusting flaps respectively provided at a corresponding one of the plurality of outlet openings and configured to change a direction of air blown from the corresponding outlet opening or to block an air current from the corresponding outlet opening; and a controller which controls the respective airflow direction adjusting flaps in each of the plurality of indoor unit in order to operate each of the plurality of indoor units in a full supply operation mode in which air is supplied to the indoor space from all of the respective plurality of outlet openings or a partial supply operation mode in which the air current coming from one or some of the plurality of outlet openings is blocked, thereby increasing a speed of the air current coming from the rest of the plurality of outlet openings, wherein assuming that one of two of the indoor units adjacent to each other with the predetermined distance interposed therebetween is a first indoor unit and the other indoor unit is a second indoor unit, that one of the plurality of outlet openings provided at the first indoor unit is a first outlet opening, and that one of the plurality of outlet openings provided at the second indoor unit which faces the first outlet opening of the first indoor unit with the predetermined distance interposed therebetween is a second outlet opening, the controller causes both of the airflow direction adjusting flap provided at the first outlet opening of the first indoor unit and the airflow direction adjusting flap provided at the second outlet opening of the second indoor unit to be positioned at a horizontal airflow position while both of the first indoor unit and the second indoor unit operate in the partial supply operation mode.

2. The air-conditioning system of claim 1, wherein the controller controls each of the plurality of indoor units such that the full supply operation mode and the partial supply operation mode are performed in a predetermined sequence in each of the plurality of indoor units.

3. The air-conditioning system of claim 2, wherein
the indoor casing of each of the plurality of indoor units has a rectangular lower surface, and
the plurality of outlet openings are arranged such that one main outlet opening is provided along one of the four sides of the rectangular lower surface.

4. The air-conditioning system of claim 2, wherein the controller controls the airflow direction adjusting flaps of the plurality of indoor units adjacent to each other with the predetermined distance interposed therebetween so that switching between the full supply operation mode and the partial supply operation mode occurs at the same time in the plurality of indoor units.

* * * * *